Aug. 18, 1953   R. J. MILLER   2,649,333
METHOD AND APPARATUS FOR FLUID MIXING AND SPRAYING
Filed Feb. 21, 1950   2 Sheets-Sheet 1
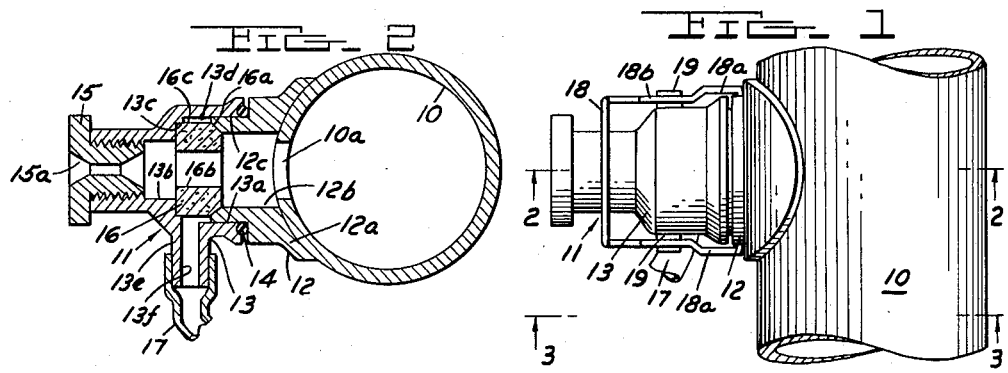
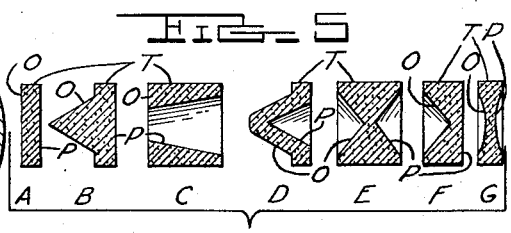
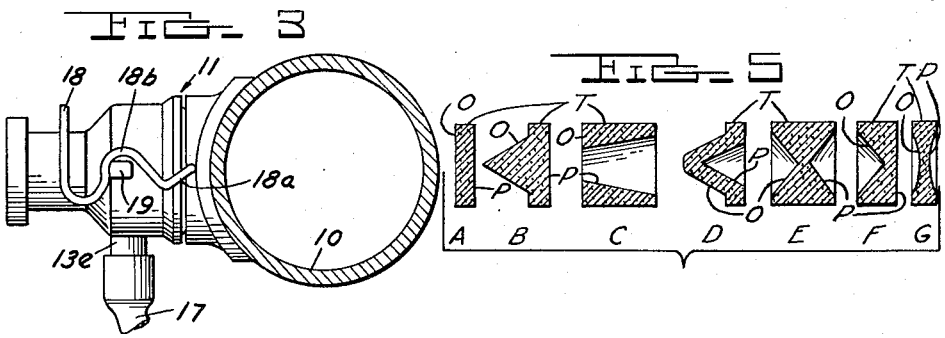
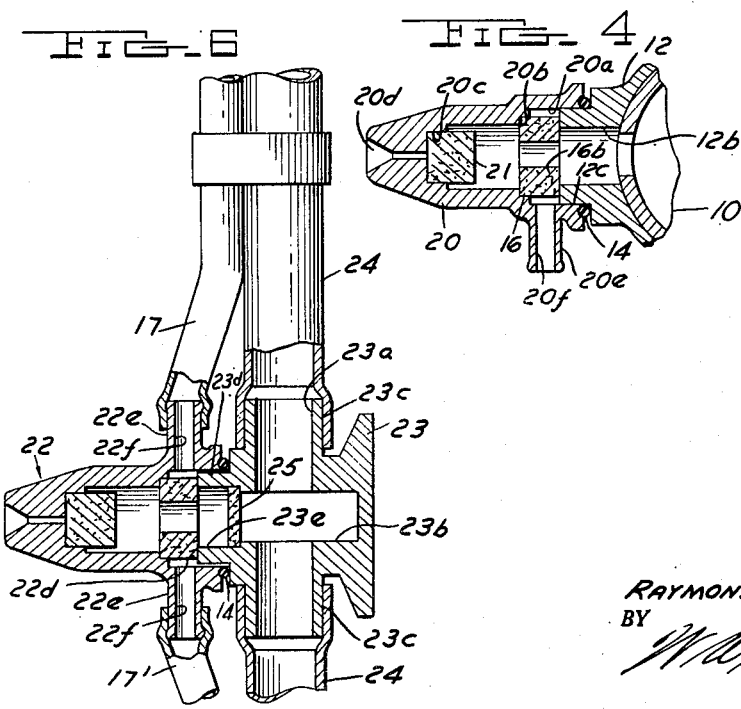
INVENTOR.
RAYMOND J. MILLER
BY
ATTORNEY

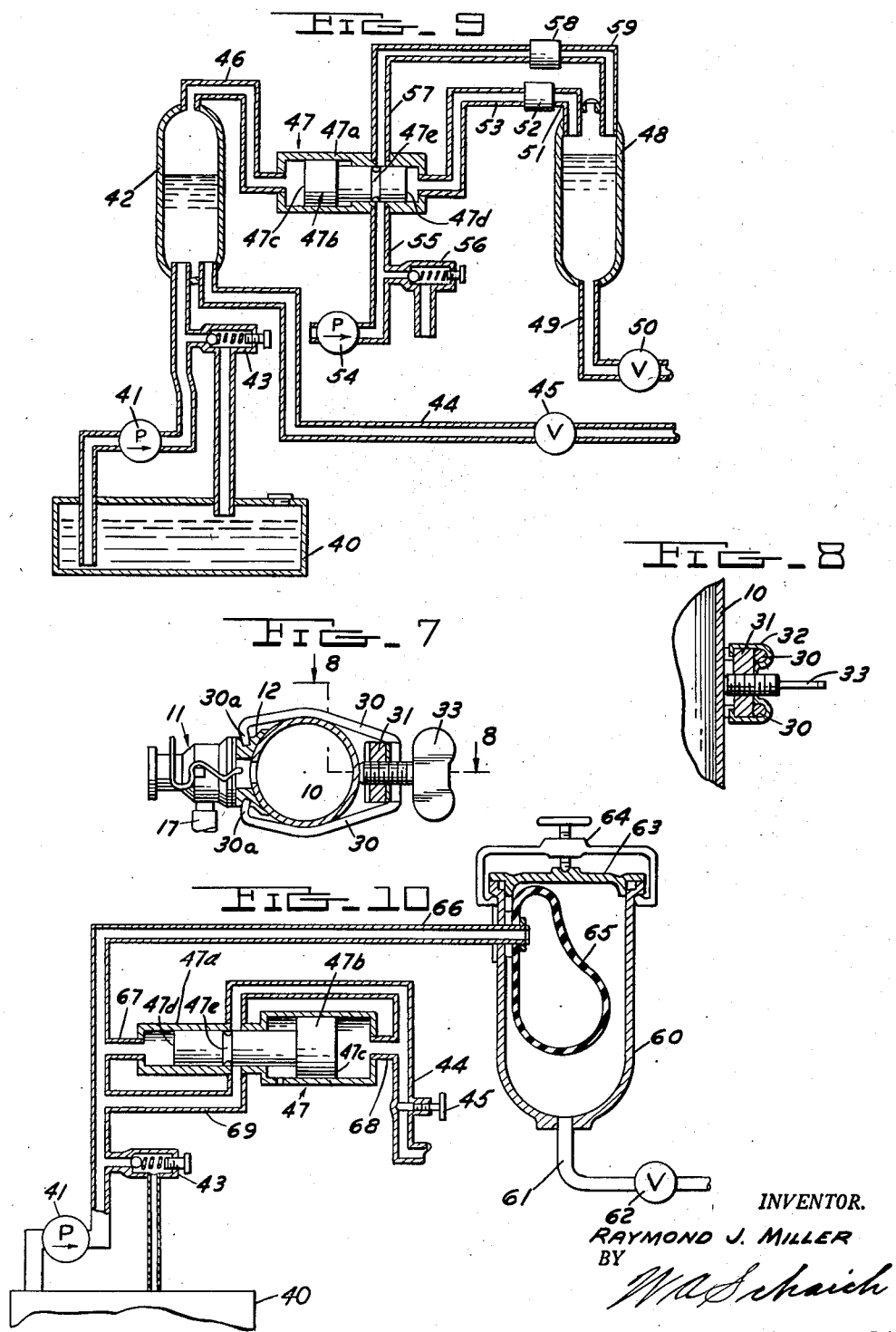

Patented Aug. 18, 1953

2,649,333

UNITED STATES PATENT OFFICE 2,649,333

METHOD AND APPARATUS FOR FLUID MIXING AND SPRAYING

Raymond J. Miller, Detroit, Mich., assignor to Dearborn Motors Corporation, Highland Park, Mich., a corporation of Delaware Application February 21, 1950, Serial No. 145,528

14 Claims. (Cl. 299—84)

This invention relates to improved methods and apparatus for mixing and spraying fluids and, while not limited thereto, finds particular application in the field of agricultural spraying.

The employment of sprays in agriculture has increased tremendously in the past few years. While the use of sprays has been quite common in orchard culture, large new fields of application have been opened by the recent development of very effective spray concentrates for killing various types of noxious weeds, for defoliation and for the destruction of insects.

With few exceptions, all agricultural sprays employ water as the primary or carrier fluid and require the injection and thorough mixture in the primary fluid of a proportional quantity of spray concentrate. However, a number of problems have been encountered in agricultural spraying. In the first place, the desired ratio of concentrate or toxic fluid to the carrier fluid is generally quite small, so that great difficulty has been encountered in properly metering the amount of toxic fluid to be introduced into a given quantity of the carrier fluid. Secondly, many of the toxic fluids are not readily dispersible in the carrier fluid and hence require continuous agitation of the fluid mixture to maintain a dispersion of the toxic fluid throughout the carrier fluid. Heretofore, such agitation has generally been accomplished by utilizing a larger capacity pump than is actually required for discharge of the mixed spray and employing the excess capacity of the pump solely for recirculating and agitating the fluid mixture carried in the tank or similar container of the spraying apparatus. Lastly, and most important from the standpoint of the farmer user, is the fact that once the spraying rig has been employed for spraying a particular fluid concentrate, it is an extremely difficult job to clean the spray rig sufficiently to insure that its subsequent use with another type of spray concentrate will not be contaminated by the original spray concentrate. This is a particularly annoying problem when a weed killing type of spray has been initially used in the spray rig and then it is desired to use the same rig to spray an insect destroying concentrate on a leafy type vegetable crop. It often happens that the small residue of the weed killing concentrates remaining in the spray rig, even after extensive cleaning attempts, will produce sufficient contamination of the latter spray to seriously harm the crop to which the second spray is applied.

Accordingly, this invention embodies several new concepts in both methods and apparatus for proportionally mixing fluids and for spraying the resultant fluid mixture, with the object of overcoming all of the above mentioned problems and improving the effectiveness and operational facility of agricultural spraying, while at the same time reducing the size, cost and capacity of the spraying apparatus.

One basic concept and objective of this invention lies in the provision of a novel method and apparatus for effecting the proportional mixing of the toxic fluid in the carrier fluid at a point adjacent to the discharge nozzle of the spraying rig, thereby eliminating the need for excess pump capacity for recirculating mixed fluids for agitation purposes.

A further basic concept and objective of this invention lies in the conducting of the carrier fluid and the toxic fluids by separate conduits to a proportional mixing device located adjacent to the discharge nozzle and in providing quickly detachable connections of the proportional mixing device and the toxic fluid conduit to the remainder of the spraying rig so that these elements may be quickly and easily removed and replaced by identical elements whenever the rig is converted from one type of spraying operation to another. In this manner, the necessity for cleaning the spraying rig is eliminated, as the only contaminated portions of the spraying rig are removed and replaced.

Still another basic concept and objective of this invention lies in the method and apparatus for effecting accurate proportional mixing of two fluids by utilization of a porous mass of sintered particles, and particularly sintered metal particles, as a barrier between the two fluids to be mixed, and producing a differential pressure between such two fluids. This invention provides the discovery that the rate of fluid flow through a porous mass of sintered particles is a direct and predictable function of the porosity of such mass, the viscosity of the fluids, and the pressure differential existing between one surface of the mass contacted by the fluid and any other surface. It is a particular object of this invention to apply this discovery to the art of spraying, and particularly agricultural spraying, through the utilization of a mass of sintered metal particles as the device for effecting the proportional mixing of a small quantity of toxic fluid in a much larger quantity of a carrier fluid.

Other particular objects of this invention are: the provision of simple, inexpensive nozzle members for spraying rigs which effect both the proportional mixing of a toxic fluid in a carrier fluid and the discharge of the thoroughly mixed fluid in a spray form suitable for direct application to plants, live stock, or the like; the provision of inexpensive, rugged apparatus, suitable for mounting on a mobile or portable spraying rig, for producing the required differential pressure between the carrier fluid and the toxic fluid to effect the metered mixing of such fluids by a sintered metal mass; and lastly, the provision of a spraying rig wherein a minimum of parts are contaminated by the toxic fluid and all such contaminated parts are quickly detachably mounted to the remainder of the rig to permit their convenient replacement by like parts to convert the rig from one type of spray to another without cleaning operations.

The specific nature of this invention, as well as other objects and advantages thereof, will become apparent to those skilled in the art from the following detailed description, taken in conjunction with the attached sheet of drawings on which, by way of preferred example only are illustrated several embodiments of this invention.

On the drawings:

Figure 1 is a side elevational view of a portion of a spray boom embodying a nozzle and mixing device constructed in accordance with this invention.

Figure 2 is a sectional view taken on the plane 2—2 of Figure 1.

Figure 3 is a sectional view taken on the plane 3—3 of Figure 1.

Figure 4 is a sectional view of a modified construction of combined nozzle and mixing devices embodying this invention.

Figure 5 is a composite view illustrating various modified shapes of sintered particle masses usable as proportional fluid mixing devices.

Figure 6 is an elevational view of a portion of a spray boom, partly in section, employing a further modification of a combined nozzle and mixing device embodying this invention.

Figure 7 is an elevational view, shown partly in section, of a modified manner of securing a combined metering and spraying nozzle to the spray boom.

Figure 8 is a sectional view taken on the plane 8—8 of Figure 7.

Figure 9 is a schematic view of a hydraulic system for producing a constant pressure differential between the primary fluid and the toxic fluid supplied to the spraying rig.

Figure 10 is a schematic view illustrating a modified hydraulic system for producing a constant pressure differential between the primary fluid and the toxic fluid supplied to the spraying rig.

As shown on the drawings:

Referring to Figures 1 through 3, the numeral 10 indicates a portion of a spray boom or similar form of conduit which is commonly employed to conduct the primary fluid of the spray, generally water, to one or more points of discharge. A combined mixing and spraying nozzle 11 embodying this invention is suitably secured to the boom or conduit 10 adjacent to an aperture 10*a* in the wall of such conduit. The mixing nozzle 11 incorporates a tubular mounting portion 12 which has one end face 12*a* thereof arcuately shaped to snugly conform to the surface of the boom 10 and is suitably secured to the boom 10 in any desired manner, as for example, by cementing, welding or brazing. The bore 12*b* of the tubular base portion 12 is in alignment with the aperture 10*a* in the wall of the boom 10. The outer axial end of tubular base portion 12 has a reduced diameter cylindrical portion 12*c* formed thereon. A hollow nozzle body 13 has a counterbore 13*a* which permits it to be snugly mounted on cylindrical surface 12*c* and an O-ring seal 14 is suitably mounted intermediate tubular member 12 and nozzle body member 13 to prevent fluid leakage therebetween. Suitable means are provided to detachably secure nozzle body 13 on mounting portion 12 as will be later described. Nozzle body member 13 defines an axial bore 13*b* extending therethrough and threaded at its outer end to receive a nozzle member 15. Nozzle member 15 has a bore 15*a* which is suitably shaped so as to produce a spray discharge of fluids applied thereto under moderate pressures.

A secondary counterbore 13*c* is formed intermediate the bore 13*b* and the outermost counterbore 13*a* and this counterbore serves to position an annular porous mass 16 of sintered particles which functions as a proportional mixing device. The mass 16 may utilize any porous sintered composition, but preferably is formed of sintered, corrosive resistant, metal particles. As is well known in that art, the size of the metal particles forming the mass 16 determines the relative porosity of the mass 16, and I have discovered that the amount of fluid transmitted through such a sintered mass is a direct function of the porosity of the mass and of the fluid pressure differential.

As was previously indicated, one axial face of the annular mass 16 seats snugly in the base of the secondary counterbore 13*b* of the nozzle body 13. The other axial face of the mass 16 snugly engages the outer end of the tubular member 12 in sealing relationship. If desired, the cooperating surfaces of the mass 16 and the tubular member 12 may be bevelled as indicated at 16*a*. The bore 16*b* of the mass 16 is in direct fluid communication with the interior of the boom 10 as well as with the nozzle defining bore 15*a* of the nozzle element 15. The outer cylindrical surface 16*c* of the sintered mass 16 is spaced inwardly from the walls of the outermost counterbore 13*a* and thus defines an annular chamber 13*d*. A pipe-like radial protuberance 13*e* is integrally formed on the nozzle body 13 and its bore 13*f* communicates with the annular chamber 13*d*. A conduit 17 is detachably connected to the protuberance 13*e* in any suitable manner, for example, the conduit 17 may be formed of flexible plastic or rubber-like material which is expanded to fit snugly over such protuberance.

One of the fundamental concepts of this invention is the utilization of a mass of sintered particles as a device for effecting a proportional mixing of the toxic fluid of the spray with the carrier fluid. Referring particularly to the apparatus of this invention shown in Figures 1 through 3, the carrier fluid, generally water, may be supplied under pressure by any conventional apparatus to the interior of the boom conduit 10. The toxic fluid may likewise be supplied under pressure to the annular chamber 13*d*, however, the pressure of the toxic fluid is somewhat higher than that of the carrier fluid so that a fluid pressure differential exists between the surfaces of the sintered mass 16 which are respectively exposed to the carrier fluid and to the toxic fluid. Under these conditions, a metered amount of toxic fluid will seep through the sintered mass 16 and emerge on those surfaces of the sintered mass 16 which are contacted by the carrier fluid, particularly the bore surface 16b. Hence the toxic fluid will be picked up and intimately mixed in the carrier fluid flowing through the bore 16b and the fluid mixture will be immediately discharged in spray form through the bore 15a of the nozzle insert 15.

Many tests of apparatus embodying this invention clearly establish the fact that the rate of flow of the toxic fluid through the mass of sintered particles is determined solely by the porosity of such mass, which is constant, the viscosities of the fluids, which are also constant for a definite temperature, and by the fluid pressure differential existing across the surfaces of the mass. Hence, so long as a substantially uniform fluid pressure differential is maintained between the carrier fluid in the boom 10 and the toxic fluid at its point of entry into the annular chamber 13d, the rate of flow of toxic fluid into the carrier fluid will be substantially constant and can be conveniently selected by control of the pressure differential to produce the desired proportions in the mixture of the toxic fluid in the carrier fluid.

It should be particularly noted that with the described apparatus, no portion of the boom proper, or any of the cooperating fluid system which supplies the carrier fluid to the boom, is in any manner contaminated by the toxic fluid. Hence, if the combined nozzle and mixing device 11 and the toxic fluid conduit 17 are constructed to be quickly detachable from the boom 10, the user may eliminate the need for cleaning his spray rig when shifting from one type of spray to another through the very simple expedient of substituting a new set of mixing nozzles 11 and toxic fluid conduits 17.

To facilitate such replacement, the modification of this invention shown in Figures 1 through 3 employs a spring catch 18 which serves to detachably secure the nozzle body member 13 in assembly on the tubular body element 12. The spring catch 18 may be conveniently formed of spring wire and is bent into a generally U-shaped configuration. The wire ends 18a are pivotally secured in suitable radial apertures provided in the exterior of tubular member 12 and the intermediate arm portions of the wire 18 are formed into loops 18b which respectively cooperate with projecting lugs 19 formed on the exterior of nozzle body member 13. Hence, all of the toxic fluid contaminated portions of the mixing nozzle 11 may be removed by releasing the wire latch 18 and removing the nozzle body 13, the connected toxic fluid conduit 17 and the sintered mass 16. Obviously, in most nozzle spraying applications a plurality of such mixing nozzles 11 are provided on the spray boom 10 and all of such nozzles may be conveniently replaced in the described manner.

From the foregoing description, it will be apparent that this invention utilizes two basic method concepts in the mixing and spraying of fluids. First, there is the concept of positioning the fluid mixing and metering device closely adjacent the discharge nozzle of the spray and effecting the proportional mixing of the toxic fluid with the carrier fluid immediately before the discharge of the mixed fluids as a spray. Such method permits the pumping capacity to be limited to that necessary to produce the desired rate of discharge of the carrier fluid, and completely eliminates the necessity for substantial additional pump capacity for recirculation and agitation purposes which has been inherent in all prior spraying systems. Furthermore, the employment of a separate fluid system to supply the toxic fluid to the mixing device, coupled with the detachable connection of the mixing device to the spray boom at the point of discharge of the spray, eliminates the necessity for cleaning the entire spray rig and permits the user to quickly and conveniently shift from one type of spray to another through the simple expedient of replacing the mixing nozzle and the toxic fluid supply system. The second method embodied in the apparatus heretofore described is the utilization of a mass of sintered particles as a proportional mixing device for two fluids. In broadest terms, it will be seen that such method simply involves the disposing of a mass of porous sintered particles between two fluids to be mixed and the production of a selected pressure differential between such two fluids which will result in a metered flow of the higher pressured fluid into the lower pressured fluid, the rate of such flow being constant for any selected pressure differential and selected porosity of the mass of sintered material. The utilization of such method completely eliminates the heretofore required tedious measuring of the quantities of carrier fluids and toxic fluids introduced into the spraying apparatus.

An additional feature of this invention is the discovery that a more thorough dispersion of a toxic fluid in a carrier fluid may be conveniently produced by forcing the mixed fluids through a porous barrier of sintered particles. Referring particularly to the modification illustrated in Figure 4, it will be noted that the construction of the mixing nozzle is very similar to the modification of Figures 1 through 3 with the exception of the nozzle body. In the modification of Figure 4, the nozzle body 20 is of somewhat increased length and includes not only a primary counterbore 20a for mounting on the tubular body 12 and a secondary counterbore 20b for mounting the annular mass 16 of sintered particles, but is further provided with a tertiary counterbore 20c which supports a solid porous mass 21 formed of sintered particles directly in the path of fluid flow through the mixing nozzle. Also, the outer end of nozzle body member 20 is suitably bored to define a nozzle orifice 20d which is an alternative arrangement to the threading in of a separate nozzle member as in the modification of Figures 1 through 3.

With the described construction of Figure 4, the proportional mixing of the toxic fluid in the carrier fluid is again accomplished by the annular mass 16 of sintered particles. The mixed fluids are then forced through the porous mass 21 of sintered particles. Obviously, the sintered particles of mass 21 are in general of substantially greater size then those of the metering mass 16 so as to not require an excessive pressure to force the mixed fluids through the mass 21 with sufficient velocity to produce the desired spray discharge. In any event, the passing of the mixed fluid through a porous barrier mass 21 of sintered particles has the very desirable effect of producing a more complete dispersion of the toxic fluid throughout the carrier fluid.

It is therefore apparent that a single porous mass of sintered particles might be conveniently employed to produce both the proportional mixing and the dispersion functions. Furthermore, by suitably shaping the surfaces of such porous mass from which the mixed fluids are discharged, the porous mass may be employed to attain desired fluid flow characteristics to facilitate the formation of the discharge spray. Referring particularly to Figure 5, there is illustrated a plurality of shapes in which the porous sintered particle mass may conveniently be formed to perform the combined functions of proportional mixing of fluids, intimate dispersion of one fluid in another, and formation of fluid flow characteristics for the mixed fluid which will facilitate the production of a fine discharge spray. The six modifications have been labeled A through G respectively, and in each case the surface of the sintered mass to which the toxic fluid is applied has been indicated by the letter "T," the surface to which the carrier or primary fluid is applied is indicated by the letter "P," and the discharge or outlet surface or area has been indicated by the letter "O."

Referring back again to the modification of Figure 4, it is also apparent that the provision of the barrier mass 21 of sintered particles in the mixing nozzle will perform the additional desirable function of substantially eliminating dripping of the mixed fluids from the nozzle when the fluid pressure has been cut off from the boom conduit 10 and the toxic fluid conduit 17. In existing sprayer constructions, the dripping from the nozzles continues until all of the fluid contained in the boom leaks out. When sprays are employed which can be detrimental to vegetation or crops, great care has to be taken in the path chosen by the operator of the spraying rig to preclude the accidental damage of such crops by the drippings from the boom. Since it is a function of the porous mass of sintered particles that some pressure differential is required to force fluids therethrough, it is apparent that the barrier mass 21 will produce a substantially immediate cut-off of fluid flow whenever the supply of pressured fluid to the boom 10 and the toxic fluid conduit 17 is interrupted.

Referring to Figure 6, a modification of this invention is shown which conveniently permits any desired number of mixing nozzle units to be assembled into a spray boom of any desired length. The nozzle body portion 22 employed in this modification is of substantially similar construction to that shown in the modification of Figure 4, with the exception that a pair of hollow protuberances 22e are provided in diametrically opposed relationship, each of which define bores 22f communicating with the annular chamber 22d surrounding the annular porous mass 16 of sintered particles. Hence, toxic fluid may be supplied to one protuberance 22e by the toxic fluid conduit 17 and additionally supplied to the next mixing nozzle unit (not shown) by a continuation conduit 17' connected to the other protuberance 22e.

A mounting element 23 is provided for effecting the mounting of the nozzle body portion 22 on the boom and in communication with the fluid conduit defined by the boom. The mounting element 23 defines a main cylindrical bore 23a extending therethrough at right angles to a nozzle supply bore 23b. At each end of the main bore 23a, the mounting element 23 is provided with cylindrical surfaces 23c which respectively snugly mount pipe-like sections 24, which sections when assembled define the spraying boom. Accordingly, a spraying boom of any desired length may be conveniently assembled merely by adding an additional boom section 24, toxic fluid conduit 17, a nozzle mounting element 23, and a mixing nozzle unit 22. It will be understood that suitable connections are made to one of the boom sections 24 for supplying the carrier fluid thereto under the required pressure and, likewise, suitable connections are made to one of the toxic fluid conduit sections 17 for supplying toxic fluid thereto at the required pressure differential above the pressure of the carrier fluid.

Mounting element 23 is further provided with a cylindrical flange 23d surrounding the open end of the nozzle supply bore 23b and such flange mounts the nozzle body 22 in the same manner as in the modifications previously described. If desired, the open end of the nozzle supply bore 23b may be counterbored as indicated at 23e and a filtering disc 25 may be snugly seated in the base of such counterbore. Filtering disc 25 may also comprise a porous mass of sintered particles whose porosity is selected to produce effective filtering of the carrier fluid to prevent large foreign particles from being passed into the mixing nozzle, but which will not substantially reduce the pressure of the carrier fluid passing therethrough.

Referring to Figures 7 and 8, there is shown a modified arrangement for attaching a mixing nozzle unit 11, similar to that shown in the modification of Figures 1 through 3, to the spray boom 10. Instead of the tubular mounting unit 12 being welded to the supply boom 10, it is merely suitably shaped so as to snugly engage the surface of such boom and is detachably clamped into engagement with the boom 10 by a clamping unit comprising a pair of tong members 30 having inturned end portions 30a engaged in suitable recesses on the exterior of the tubular mounting portion 12 and bight portions clamped to a block 31 by an appropriately shaped stamping 32. A thumb screw 33 is threaded through a suitable aperture in block 31 and contacts the wall of boom 10 at a point opposite the connection of the mixing nozzle 11 thereto. Tightening of the thumb screw 33 will obviously draw the tubular mounting portion 12 into snug engagement with the boom 10.

In all of the modifications heretofore described, it was contemplated that suitable hydraulic mechanism would be provided for supplying both the carrier fluid and the toxic fluid under pressure to the mixing nozzle units and that the toxic fluid would be maintained at a selected pressure differential above the pressure of the carrier fluid. While any conventional form of hydraulic system may be employed to produce the desired pressures and pressure differential, I have schematically illustrated in Figures 9 and 10 two hydraulic arrangements of unusually simple construction for accomplishing such functions.

Referring to Figure 9, the numeral 40 indicates a suitable container or tank for carrier fluid which, as mentioned above, will generally be water. Such fluid is pressured by a pump 41 and supplied under pressure to a container 42 which has a quantity of air trapped therein. The pressure of carrier fluid in container 42 is maintained at a selected value by an adjustable relief valve 43 which bleeds back a sufficient quantity of the pressured fluid to the primary container 40 to maintain the selected pressure level in the secondary container 42. An outlet conduit 44 is connected to the secondary container 42 and supplies the pressured carrier fluid to the spray boom through a suitable shut-off valve 45.

The top end of secondary container 42 wherein the air is trapped under pressure is connected by a conduit 46 to one side of pressure differential valve 47. The pressure differential valve 47 is of well-known construction, incorporating a cylinder 47a in which is slidably mounted a piston 47b having a large area end 47c and a small area end 47d. The difference in area of the two ends 47c and 47d is exactly proportional to the pressure differential that it is desired to maintain between the toxic fluid and the carrier fluid. The large end 47c of the regulating piston 47b is exposed to the pressure of the primary fluid through conduit 46. The toxic fluid is mounted in a container 48 which has an outlet conduit 49 at its bottom end connected to the toxic fluid conduits 17 of the mixing nozzles through a suitable shut-off valve 50. A quantity of air is trapped in the top of toxic fluid container 48. The pressure of such trapped air, and hence the pressure of the toxic fluid, is applied to the small diameter end 47d of the regulating piston 47b through a conduit 51 connected to the top end of toxic fluid container 48, a quick disconnect coupling 52, and a conduit 53. Air pressure is supplied to the toxic fluid container 48 from an air pump 54 which is connected to a medial portion of the regulating valve cylinder 47a by a conduit 55. An adjustable relief valve 56 maintains the output pressure of pump 54 at a selected value. A medial portion of the piston 47b is annularly relieved as indicated at 47e and such relieved portion is located in the vicinity of the air pressure conduit 55. Opposite the air pressure conduit 55, a conduit 57 is connected to the cylinder 47a and connects with the top of toxic fluid container 48 through a quick disconnect coupling 58 and conduit 59.

From the foregoing description, it is apparent that the regulating valve unit 47 will maintain a pressure in the toxic fluid container 48 which is at a selected differential above the pressure of the carrier fluid. Hence, the proportional mixing of the toxic fluid into the carrier fluid will be accomplished by the sintered metal masses in the nozzles in the manner heretofore described. It should be particularly noted that the toxic fluid container 48 is detachably connected to the remainder of the hydraulic system by the quick disconnect couplings 52 and 58 and that there is no contamination of any portion of the remainder of the hydraulic mechanism by the toxic fluid. Hence, if it is desired to shift from one type of spray to another, the toxic fluid container 48 is removed from the system along with the mixing nozzles and the toxic fluid conduit 17 and replaced by identical elements. Hence, there is no need for cleaning any portion of the system supplying the carrier fluid. Likewise, it is unnecessary to clean the removable portions of the spray rig which have been contaminated by a particular toxic fluid as those portions may be stored until that particular toxic fluid spray is desired to be used again.

In the hydraulic system shown schematically in Figure 10, the required pressure differential between the toxic and carrier fluids may be produced by a single pump. Here again a container or tank 40 is provided for the carrier fluid and such fluid is pressured by a pump 41 and regulated by an adjustable relief valve 43. A toxic fluid container 60 is provided having a conduit 61 connected to its bottom end and connecting with the toxic fluid conduit 17 of the mixing nozzles through a shut-off valve 62. The toxic fluid container 60 has a detachable cover 63 which may be sealed thereto by a clamping unit 64. The toxic fluid contained within container 60 is subjected to the full outlet pressure of the pump 41 by a flexible bladder 65 which is disposed within the chamber 60 and has its interior connected to the outlet pressure of pump 41 by a conduit 66. To supply the carrier fluid to the mixing nozzles, a reducing and regulating valve 47, similar in all respects to the reducing and regulating valve 47 described in the modification of Figure 9, is connected intermediate the pressure side of pump 41 and a conduit 44 which leads to the boom conduit 10 through shut-off valve 45. In this instance, the small area end 47d of the regulating piston 47b is exposed to the outlet pressure of pump 41 through a conduit 67, while the large diameter end 47c of regulating piston 47b is exposed to the carrier fluid pressure through a conduit connection 68 with the carrier fluid discharge conduit 44. The conduit 44 is connected to the medial portion of the valve cylinder 47a adjacent to the annularly reduced section 47e of the piston, while a conduit 69 connects the pressure side of pump 41 to the medial portion of the cylinder 47a directly opposite the connection of conduit 44 thereto. Hence, the carrier fluid is supplied to the boom at a selected pressure below the pressure to which the toxic fluid is supplied thereto. Furthermore, no portion of the hydraulic mechanism with which the carrier fluid comes in contact is contaminated by the toxic fluid and the hydraulic system may be converted to spraying a different toxic fluid merely by replacement of the toxic fluid container 60.

From the foregoing description, it is apparent that this invention provides novel and improved methods and apparatus for fluid mixing and spraying which will not only greatly simplify agricultural types of spraying equipment, but which will provide a degree of performance and ease of handling which has in no manner been possible with methods and devices heretofore known.

It will, of course, be understood that various details of construction and process may be varied through a wide range without departing from the principles of this invention and it is, therefore, not the purpose to limit the patent granted hereon otherwise than necessitated by the scope of the appended claims.

I claim:

1. A spraying and mixing nozzle comprising a hollow body having a bore extending therethrough, a porous mass of sintered particles mounted in said bore and cooperating with a portion of said bore to define a fluid chamber separated from the remainder of said bore, means for connecting one end of said bore to a source of pressured primary fluid, and means for connecting said fluid chamber to a source of secondary fluid pressured to a higher value than said primary fluid, the pressure differential between said primary and secondary fluids being proportioned to the porosity of said porous mass, whereby a desired proportional mixture of said fluids is discharged from the other end of said bore.

2. A spraying and mixing nozzle comprising a hollow body member having a bore extending therethrough, means in one end of said bore defining a spray producing orifice, a pair of counterbores formed in the other end of said bore, an annular porous mass of sintered particles seated in the smaller of said counterbores and cooperating with said larger counterbore to define an annular chamber separated from said bore, means for connecting said bore to a source of pressured carrier fluid, and means for connecting said annular chamber to a source of toxic fluid pressured to a higher value than said primary fluid, the pressure differential between said carrier and toxic fluids being proportioned to the porosity of said porous mass, whereby a metered mixture of said toxic fluid in said carrier fluid is produced.

3. A spraying and mixing nozzle comprising a hollow body member having a bore extending therethrough, means in one end of said bore defining a spray producing orifice, a plurality of successive counterbores formed in the other end of said bore, a solid porous mass of sintered particles seated in the first and smallest of said counterbores, an annular porous mass of sintered particles seated in a second counterbore and cooperating with a third counterbore to define an annular chamber separated from said bore, means for connecting said bore to a source of pressured carrier fluid, and means for connecting said annular chamber to a source of toxic fluid pressured to a higher value than said primary fluid, the pressure differential between said carrier and toxic fluids being proportioned to the porosity of said porous mass, whereby a metered mixture of said toxic fluid in said carrier fluid is produced.

4. A spraying and mixing nozzle comprising a hollow body member having a bore extending therethrough, means in one end of said bore defining a spray producing orifice, a plurality of successive counterbores formed in the other end of said bore, an annular porous mass of sintered particles seated in the first and smallest of said counterbores and projecting axially into the second counterbore, a hollow mounting element having tubular portion snugly insertable in said second counterbore, said annular porous mass cooperating with said second counterbore and said tubular portion to define an annular chamber separate from said bore, means for connecting said hollow mounting element to a source of pressured carrier fluid, and means for connecting said annular chamber to a source of toxic fluid pressured to a higher value than said primary fluid, the pressure differential between said carrier and toxic fluids being proportioned to the porosity of said porous mass, whereby a metered mixture of said toxic fluid in said carrier fluid is produced.

5. A spraying and mixing nozzle comprising a hollow body member having a bore extending therethrough, means in one end of said bore defining a spray producing orifice, a plurality of successive counterbores formed in the other end of said bore, an annular porous mass of sintered particles seated in the first and smallest of said counterbores and projecting axially into the second counterbore, a hollow mounting element having tubular portion snugly insertable in said second counterbore, means for detachably securing said body member to said mounting element, said annular porous mass cooperating with said second counterbore and said tubular portion to define an annular chamber separate from said bore, means for connecting said hollow mounting element to source of pressured carrier fluid, and means for connecting said annular chamber to a source of toxic fluid pressured to a higher value than said primary fluid, the pressure differential between said carrier and toxic fluids being proportioned to the porosity of said porous mass, whereby a metered mixture of said toxic fluid in said carrier fluid is produced.

6. A device for proportionally mixing a secondary fluid in a primary fluid comprising means producing a flow of said primary fluid, a porous mass of sintered particles, means for positioning said mass with one surface thereof in contact with said flow of primary fluid, and means for supplying said secondary fluid to another surface of said mass remote from said one surface, said last mentioned means producing a pressure of said secondary fluid on said mass in excess of the pressure of said primary fluid, the pressure differential between said primary and secondary fluids being proportioned to the porosity of said porous mass to produce a desired metered flow of secondary fluid through said mass into said primary fluid.

7. A device for proportionally mixing fluids comprising means defining a first chamber for containing a primary fluid, means defining a second chamber for containing a secondary fluid and a common wall between said first and second chambers having at least a portion thereof consisting of a porous mass of sintered particles, and means for maintaining a fluid pressure differential between said first and second chambers, the pressure differential between said primary and secondary fluids being proportioned to the porosity of said porous mass to produce a desired metered flow of said secondary fluid into said primary fluid.

8. A device for proportionally mixing fluids comprising a conduit, means for flowing a primary fluid through said conduit, a hollow mass of sintered particles having its bore communicating with said conduit, means directing a secondary fluid into contact with an external surface of said hollow mass, and means for producing a pressure differential between said primary and secondary fluids, the pressure differential between said primary and secondary fluids being proportioned to the porosity of said porous mass to produce a desired metered flow of said secondary fluid into said primary fluid.

9. A fluid spraying and mixing device comprising a generally conically shaped porous mass of sintered particles, said mass having a concentrically disposed conical recess formed therein.

10. A fluid spraying and mixing device comprising a generally conically shaped porous mass of sintered particles, said mass having a concentrically disposed conical recess formed therein, means for directing a primary fluid under pressure into said recess, means for applying a secondary fluid to the external surface of said mass, and means for maintaining a pressure differential between said primary and secondary fluids.

11. A device for spraying mixtures of a toxic fluid and a carrier fluid comprising a first fluid system for supplying said carrier fluid to a discharge opening, a second fluid system for supplying said toxic fluid at a pressure greater than the discharge pressure of said carrier fluid, a mass of sintered metal particles associated with said second fluid system so that said toxic fluid is applied under pressure to one surface of said mass, means for detachably connecting said mass to said first fluid system adjacent the discharge opening thereof and in position to have another surface thereof contacted by carrier fluid discharged through said discharge opening, the pressure differential between said carrier and toxic fluids being proportioned to the porosity of said porous mass to produce a metered flow of said toxic fluid into said carrier fluid.

12. In a spraying device, fluid mixing means, independent conduits for respectively supplying a carrier fluid and a toxic fluid to said fluid mixing means, a carrier fluid container, pump means for pressuring said carrier fluid, a toxic fluid container communicating with the respective one of said conduits, a bladder in said toxic fluid container, means connecting the interior of said bladder to the pressure side of said pump means, thereby pressuring the toxic fluid in said toxic fluid container, and regulating valve means connected intermediate said pump means and the other of said conduits for supplying pressured carrier fluid to said fluid mixing means at a selected pressure differential relative to said toxic fluid.

13. The method of proportionally mixing a primary fluid with a secondary fluid comprising disposing the primary fluid adjacent to one surface of a porous mass of sintered particles, disposing the secondary fluid adjacent to another surface of said mass remote from said one surface, and producing a higher pressure in said primary fluid than in said secondary fluid, the pressure differential between said primary and secondary fluids being proportioned to the porosity of said porous mass to produce a desired proportional mixing of said fluids.

14. In a sprayer having a pressured carrier fluid conduit and a hollow nozzle body mounted on said conduit and in fluid communication therewith, the improvements comprising a nozzle tip structure mountable on said nozzle body, quick detachable means for securing said nozzle tip to said nozzle body in fluid tight relationship, said nozzle tip defining a first fluid passage adapted to communicate with said hollow portion of said nozzle body and a second passage separate from said first passage, a fluid mixing device disposed intermediate said first and second passages and providing the sole fluid communication between said first and second passages, means for supplying pressured toxic fluid to said second passage, and means on said nozzle tip structure for discharging the resulting mixed fluids in a spray form, whereby detachment of said nozzle tip structure removes all elements contaminated by toxic fluid from the sprayer.

RAYMOND J. MILLER.

References Cited in the file of this patent

UNITED STATES PATENTS

| Number | Name | Date |
|---|---|---|
| 815,713 | Joslin | Mar. 20, 1906 |
| 1,192,645 | Koerting | July 25, 1916 |
| 1,437,331 | Alexander | Nov. 28, 1922 |
| 1,727,294 | Lennon | Sept. 3, 1929 |
| 1,806,365 | Paasche | May 19, 1931 |
| 1,886,369 | Bogart | Nov. 8, 1932 |
| 2,178,539 | Hill et al. | Nov. 7, 1939 |
| 2,359,386 | Reinsch | Oct. 3, 1944 |
| 2,500,816 | Gird | Mar. 14, 1950 |
| 2,511,626 | Einbecker | June 13, 1950 |
| 2,515,394 | Clarkson | July 18, 1950 |

FOREIGN PATENTS

| Number | Country | Date |
|---|---|---|
| 528,619 | Germany | July 1, 1931 |